United States Patent Office 2,940,976
Patented June 14, 1960

2,940,976

1-(LOWER-ALKYL)-4-(QUATERNARY-AMMONIUM-ALKYLIMINO)-1,4-DIHYDROQUINOLINES

Alexander R. Surrey, Albany, N.Y., assignor to Sterling Drug Inc., New York, N.Y., a corporation of Delaware No Drawing. Filed June 19, 1957, Ser. No. 666,785

9 Claims. (Cl. 260—286)

This invention relates to compositions of matter of the class of basic quinoline derivatives, to their acid-addition salts, and to the preparation of these compounds.

The invention here resides in a composition of matter selected from the group consisting of: (a) a 1,4-dihydroquinoline that is substituted by a lower-alkyl radical at the 1-position, by a lower-(quaternary-ammonium)-(ethyl- or propyl)imino radical at the 4-position, by from one to two other substituents selected from the group consisting of halo, lower-alkoxy, lower-alkylmercapto, lower-alkyl, nitro and trifluoromethyl radicals at one of the normally aromatic positions of the quinoline nucleus, and, optionally, by a lower-alkyl substitutent at the 2-position of the quinoline nucleus; and, (b) acid-addition salts thereof.

My compounds in free base form have the general Formula I

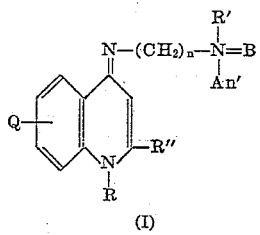

(I)

where Q represents H or from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, n is an integer from 2 to 3, N=B is a lower-tertiary-amino radical, An' is an anion, R is a lower-alkyl radical, R' is a member selected from the group consisting of lower-alkyl and (monocarbocyclic-aryl)methyl radicals, and R" is a member selected from the group consisting of H and lower-alkyl radicals.

In the above general Formula I the quinoline nucleus can be unsubstituted at the positions other than 1 and 4 or it can be substituted further at one to two of the normally aromatic positions of the quinoline ring, namely, 3, 5, 6, 7 or 8, by the substituents named above. When Q designates two substituents, they can be the same or different and can be in any of said available aromatic positions relative to each other. The halo substituents can be chloro, bromo, iodo or fluoro. The lower-alkoxy, lower-alkylmercapto and lower-alkyl substituents have preferably from one to six carbon atoms and includes: methoxy, ethoxy, n-propoxy, isopropoxy, n-butoxy, isobutoxy, 2-butoxy, n-pentoxy, n-hexoxy and the like when lower-alkoxy; methylmercapto, ethylmercapto, n-propylmercapto, isobutylmercapto, n-hexylmercapto and the like when lower-alkylmercapto; and methyl, ethyl, n-propyl, isopropyl, n-butyl, n-hexyl and the like when lower-alkyl.

The quinoline nucleus can be further substituted at the 2-position by a lower-alkyl radical represented above as R" and illustrated by methyl, ethyl, n-propyl, isobutyl, n-butyl, n-hexyl and the like.

When representing lower-alkyl radicals, R and R' can be the same or different and each has preferably from one to six carbon atoms and comprehends radicals such as methyl, ethyl, n-propyl, isopropyl, n-butyl, isobutyl, 2-butyl, n-pentyl, isopentyl, n-hexyl, and the like.

When representing a (monocarbocyclic-aryl)methyl radical, R' comprehends such radicals where monocarbocyclic-aryl, which can be designated as Ar', stands for an aryl radical of the benzene series. The aryl radical Ar' includes the unsubstituted-phenyl radical and phenyl radicals substituted by substituents including halo, nitro, lower-alkoxy, lower-alkyl, lower-alkylmercapto, trifluoromethyl, and the like. The substituted-phenyl radicals have preferably from one to three substituents including those given above; and, furthermore, these substituents can be in any of the available positions of the phenyl nucleus, and where more than one substituent, they can be the same or different and they can be in any of the various position combinations relative to each other. Thus R' comprehends the unsubstituted-benzyl radical as well as substituted-benzyl radicals illustrated by: nitrobenzyl radicals including 4-nitrobenzyl, 3-nitrobenzyl, 2-nitrobenzyl, etc.; (lower-alkoxylated)-benzyl including 3-ethoxybenzyl, 2-methoxybenzyl, 2,4-dimethoxybenzyl, 2,4,6-trimethoxybenzyl, 3,4-diethoxybenzyl, etc.; (lower-alkylated)-benzyl including 4-methylbenzyl, 3-ethylbenzyl, 2-methylbenzyl, 2,4-dimethylbenzyl, 3,4,5-trimethylbenzyl, 4-isopropylbenzyl, etc.; halogenated-benzyl including 2-chlorobenzyl, 4-chlorobenzyl, 2,4-dibromobenzyl, 3-iodobenzyl, 2,4-dichlorobenzyl, 3,4-dichlorobenzyl, 2,4,6-trichlorobenzyl, 4-fluorobenzyl, etc.; and other substituted-benzyl radicals including 3-trifluoromethylbenzyl, 4-methylmercaptobenzyl, and the like.

The above designation N=B comprehends pharmacodynamically acceptable lower-tertiary-amino radicals, preferred embodiments being di-(lower-alkyl)amino radicals where the lower-alkyl radicals are alike or different and each alkyl radical has preferably from one to six carbon atoms, such dialkylamino radicals including dimethylamino, diethylamino, ethyl-methylamino, diisopropylamino, ethyl-n-propylamino, di-n-butylamino, di-n-hexylamino, and the like. The designation N=B also comprehends lower-tertiary-amino radicals wherein the nitrogen atom bears one lower-alkyl radical having from one to six carbon atoms as illustrated above and a second radical such as a cycloalkyl radical having from three to six ring-carbon atoms, a lower-hydroxyalkyl radical having from two to six carbon atoms or a (monocarbocyclic-aryl)methyl radical as illustrated above for R and R', such lower-tertiary-amino radicals including ethyl-cyclohexylamino, ethyl-2-hydroxyethylamino, ethyl-(2-chlorobenzyl)amino, and the like. Further, N=B comprehends saturated N-heteromonocyclic radicals having five to six ring atoms, illustrated by 1-piperidyl; (lower-alkylated)-1-piperidyl including 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl including 2-methyl-1-pyrrolidyl, 3-ethyl-1-pyrrolidyl, 2,5-dimethyl-1-pyrrolidyl; 4-morpholinyl; and the like.

The anion designated above as An', which can be any pharmacodynamically acceptable anion, for instance, chloride, bromide, iodide, sulfate, phosphate, benzenesulfonate, para-toluenesulfonate, citrate, tartrate, and the like, has no appreciable activity of its own in the high dilutions at which the quarternary ammonium salts as a whole are effective. In particular, the anions appear to contribute nothing to the pharmacodynamic properties which inhere to the cation portion of the substituted-1,4-dihydroquinolines of the present invention. However, preferred compounds are those in which An' is halide, in particular, chloride, iodide or bromide, since these are derived from readily available starting materials. By a pharmacodynamically acceptable anion, I mean any anion which is innocuous to the animal organism in pharmacodynamic doses of quarternary ammonium salt, so that beneficial physiological properties inherent in the cation are not vitiated by any possible side-effects ascribable to the anions; in other words, the latter do not substantially affect the pharmacodynamic properties inherent in the cations.

Preferred embodiments are my compounds in the form of their acid-addition salts, which can be represented by the general structural Formula II

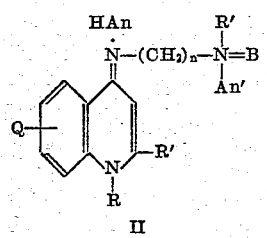

where Q, $n$, N=B, R', R", An' and R have the meanings designated above. An is an anion which has the same meaning given above for An' and can be the same as or different from An' for a given compound.

Concerning the structure of the acid-addition salts represented above as Formula II, the following considerations are presented. From chemical and physical data it appears that structure II is actually a resonance hybrid whose main contributing structures are represented as follows by A↔B

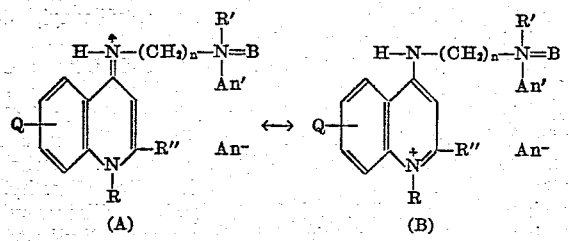

Since my compounds in free base form (Formula I) are readily obtained from their acid-addition salts by reaction with an acid-acceptor, as shown below, and since they are readily reconverted into their acid-addition salts by treatment with an acid, I prefer to represent the acid salt form by Formula II. As an illustration, I prefer to represent the hydrochloride salt of 7-chloro-1-methyl-4 - (2 - diethylaminoethylimino) - 1,4 - dihydroquinoline omega-methochloride by the following structural Formula IIa ("omega" designating attachment of the methyl radical and chloride ion at the terminal nitrogen atom of the basic side-chain attached to the 4-position of the quinoline ring):

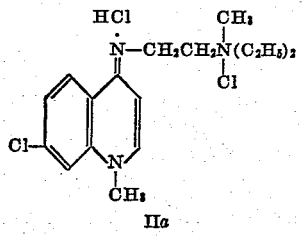

Alternately, this compound can be named 7-chloro-1-methyl - 4 - [2-(N,N-diethyl-N-methylammonium)ethylamino]quinolinium dichloride or 7-chloro-4-(2-diethylaminoethylamino)quinoline bis(methochloride) and can be represented by the structural Formula IIb

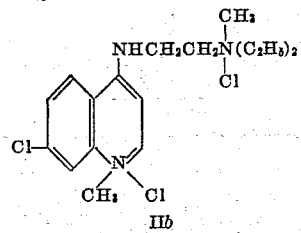

Thus, it is to be understood that although I prefer to represent the acid-addition salt form of my compounds by the structural formula designated above as II, i.e., as an acid-addition salt of a 1-(lower-alkyl)-4-(quaternary-ammonium-alkylimino) - 1,4 - dihydroquinoline salt, this 4-imino-1,4-dihydroquinoline structure actually represents only one of the contributing members of a resonance hybrid; and, further, it is to be understood that the salt form of my invention comprehends not only this 4-imino-1,4-dihydroquinoline structure (as specifically illustrated above as IIa) but also other contributing members of the resonance hybrid including the 1-(lower-alkyl)-4-(quaternary - ammonium - alkylamino)-quinolinium salt structure (as specifically illustrated above as IIb).

The compounds of Formula II where R and R' are both lower-alkyl radicals and are the same (and where An and An' are the same) are conveniently prepared by reacting the corresponding 4-(tertiary-aminoalkylamino)-quinoline of the Formula III

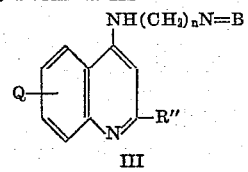

where Q, $n$, N=B and R" have the meanings designated above, with at least two molar equivalents of a lower-alkyl ester of the formula R—An and, if the compounds of Formula I are desired, then reacting the resulting acid-addition salt of the 1-(lower-alkyl)-4-(quaternary-ammonium-alkylimino)-1,4-dihydroquinoline salt (Formula II above) with an acid-acceptor to yield the product in free base form (Formula I). Thus, the reaction of 3,7-dichloro-4-(2-diethylaminoethylamino)quinoline with two moles of n-propyl iodide yields the hydriodide of 3,7-dichloro - 4 - (2 - diethylaminoethylimino)-1-n-propyl-1,4-dihydroquinoline omega-n-propiodide which when reacted with an acid acceptor yields 3,7-dichloro-4-(2-diethylaminoethylimino) - 1 - n-propyl-1,4-dihydroquinoline omega-n-propiodide.

The step of reacting the 4-(tertiary-aminoalkylamino)-quinoline (Formula III) with the ester R—An is carried out by simply mixing the reactants, and it will take place slowly at room temperature or below, although application of heat is preferred to speed up the reaction. Also, a reaction medium inert under the conditions of the reaction as for example, acetone, acetonitrile, ethanol, and the like, can be used. If an inert solvent is used, the product usually separates from solution upon cooling, or can be obtained by concentration of the solution. The reaction takes place most readily with lower-alkyl esters R—An where An is the anion of a strong inorganic acid or an organic sulfonic acid. The chloride, bromide or iodide are preferred because of the more ready availability of the requisite lower-alkyl halides. Compounds where the anion An (or An') is other than halogen can be prepared preferably by the procedure described below.

The step of reacting the acid-addition salt of the 1-(lower-alkyl) - 4 - (quaternary-ammonium-alkylimino)-1,4-dihydroquinoline (Formula II) with an acid-acceptor is carried out at room temperature or by heating, if necessary, up to a temperature of about 100° C. The reaction is preferably carried out in an organic solvent inert under the conditions of the reaction as for example, anhydrous ethanol, methanol, and the like. The purpose of the acid-acceptor is to take up the hydrogen halide (or HAn) which is split out during the course of the reaction. The acid-acceptor is a basic substance which preferably forms freely water-soluble by-products easily separable from the product of the reaction, including for example, sodium hydroxide, potassium hydroxide, sodium carbonate, potassium carbonate, sodium acetate, sodium alkoxides, potassium alkoxides, sodium amide, and the like.

The compounds of my invention where R is a lower-alkyl radical and R' is a different lower-alkyl radical or a (monocarbocyclic-aryl)methyl radical (Ar'CH$_2$) are prepared by reacting a 1-(lower-alkyl)-4-(tertiary-aminoalkylimino)-1,4-dihydroquinoline having the Formula IV

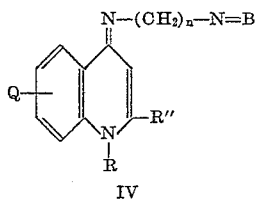

IV where Q, $n$, N=B, R'' and R have the meanings designated above, with one molar equivalent of an ester having the formula R'—An', thereby yielding the product in free base form (Formula I). Use of an acid-addition salt of IV yields the product in the form of its acid-addition salt (Formula II). Thus, 7-chloro-4-(3-diethylaminopropylimino)-1-methyl-1,4-dihydroquinoline omega - benzochloride is formed by reacting 7-chloro-4-(3-diethylaminopropylimino)-1-methyl-1,4-dihydroquinoline with one molar equivalent of benzyl chloride. Use of the hydrochloride of 7-chloro-4-(3-diethylaminopropylimino)-1-methyl-1,4-dihydroquinoline in place of the free base form yields the hydrochloride of 7-chloro-4-(3-diethylaminopropylimino)-1-methyl-1,4-dihydroquinoline omega-benzochloride.

The reaction conditions for the reaction of the 1-(lower-alkyl) - 4 - (tertiary-aminoalkylimino) - 1,4 - dihydroquinoline (Formula IV) or its acid-addition salt with the ester R'—An' are like those described hereinabove for the reaction of the corresponding 4-(tertiary-aminoalkylamino)-quinoline (Formula III) with two molar equivalents of the ester R—An. As above, the preferred esters are those where An' is chloride, iodide or bromide.

The intermediate 1 - (lower-alkyl)-4-(tertiary-aminoalkylimino)-1,4-dihydroquinolines (Formula IV) and their acid-addition salts are disclosed and claimed in my copending application Serial No. 666,764, filed June 19, 1957.

Compounds of my invention where the anion An' is other than halide, for example, nitrate, sulfate, phosphate, benzenesulfonate, etc., and in particular, where it is an anion derived from weak acids including the acetate, citrate, tartrate, oleate, lactate, and the like, can be prepared from the compounds where An' is a halide ion. This procedure is carried out by treating the quaternary ammonium halide (Formula I) with silver oxide which produces the corresponding quaternary ammonium hydroxide, the halide ion being removed in the form of silver halide. The quaternary ammonium hydroxide can then be converted to any desired salt by neutralization with the appropriate acid. Reaction of the quaternary ammonium hydroxide with two molar equivalents of the acid results in the formation of the corresponding acid-addition salt (Formula II). Alternatively, the ion-exchange can be effected by contact with an anion exchange resin saturated with the desired anion.

The acid-addition salts of my compounds (Formula II) where An is the same as An' and represents the anion of a strong acid and where R' is the same as R are preferably prepared directly by the procedure outlined above, that is, by reacting the corresponding 4-(tertiary-aminoalkylamino)quinoline (Formula III) with two molar equivalents of a lower-alkyl ester of the formula R—An. Salts where An is the anion of a strong or weak acid can be prepared by treating the corresponding compound in free base form (Formula I) with the appropriate acid, or by treating an acid-addition salt (Formula II) prepared directly as noted above with an anion exchange resin saturated with the desired anion (in the latter instance, An' will also be exchanged by the anion of the resin). Appropriate acid-addition salts are those derived from mineral acids including hydrochloric acid, hydrobromic acid, hydriodic acid, nitric acid, sulfuric acid and phosphoric acid; and organic acids including acetic acid, citric acid, lactic acid, and tartaric acid. The acid-addition salts are prepared from the free base form (Formula I) by dissolving the base (I) in an aqueous solution containing the appropriate acid and isolating the salt by evaporating the solution, or by reacting the free base and acid in an organic solvent, in which case the salt separates directly or can be obtained by concentrating the solution.

Evaluation of the compounds of my invention by standard test procedures has shown them to have useful pharmacodynamic properties, in particular, ganglionic blocking activity.

The following examples will further illustrate the invention, without the latter being limited thereto.

EXAMPLE 1

A. 4-[lower-(tertiary-amino)-alkylamino]-quinolines

These intermediate basic quinolines in the form of their free bases and acid-addition salts are generally known in the art. They are prepared by reacting the appropriate 4-haloquinoline with a tertiary-aminoethylamine or tertiary-aminopropylamine of the formula H$_2$N—(CH$_2$)$_n$—N=B where $n$ and N=B have the meanings given above. New compounds of this type that I prepared as intermediates for the synthesis of the 4-[lower-(tertiary-amino)-ethyl- or propylimino]-1-(lower-alkyl)-1,4-dihydroquinolines of my invention are given in Table A.

TABLE A

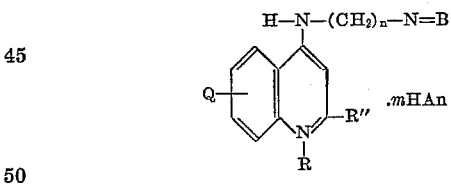

.mHAn

| Q | R'' | $n$ | N=B | mHAn | M.P., °C., corr. |
|---|---|---|---|---|---|
| 7-Cl | H | 2 | N(CH$_3$)$_2$ | base | a 121.0–122.8 |
| 7-Cl | H | 2 | N(C$_2$H$_5$)$_2$ | 2HCl | b,c 279.4–283.0 |
| 5-Cl | H | 2 | N(CH$_3$)$_2$ | 2H$_3$PO$_4$ | b 252.4 |
| 5-Cl | H | 2 | N(C$_2$H$_5$)$_2$ | 2H$_3$PO$_4$ | 226.4–228.6 |
| 5-Cl | H | 3 | N(CH$_3$)$_2$ | 2H$_3$PO$_4$ | 233.6–236.2 |
| 5-Cl | H | 3 | N(C$_2$H$_5$)$_2$ | 2H$_3$PO$_4$ | 244.6–247.4 |
| 5-Cl | H | 2 | N(C$_4$H$_9$-n)$_2$ | 2H$_3$PO$_4$ | 214.6–217.0 |
| 3-Cl | H | 2 | N(C$_2$H$_5$)$_2$ | 2HCl | 219.0–226.4 |
| 3,7-di-Cl | H | 2 | N(C$_2$H$_5$)$_2$ | base | 67.2– 73.4 |
| 6,7-di-Cl | H | 2 | N(C$_2$H$_5$)$_2$ | base | 116.4–118.0 |
| 8-OCH$_3$ | H | 2 | N(C$_2$H$_5$)$_2$ | base | 126.2–128.8 |
| 6-OCH$_3$ | H | 2 | N(C$_2$H$_5$)$_2$ | base | 94.8– 98.8 |
| H | H | 2 | N(CH$_3$)$_2$ | 2HCl | 224.8–227.0 |
| H | H | 2 | N(C$_2$H$_5$)$_2$ | 2HCl | 138.6–143.6 |
| H | CH$_3$ | 2 | N(C$_2$H$_5$)$_2$ | 2H$_3$PO$_4$ | 247.2–262.2 |
| 7-CH$_3$ | H | 2 | N(C$_2$H$_5$)$_2$ | base | 99.0–103.6 | a Base shown by Tarbell et al., JACS 68, 1217 (1946).
b With decomposition.
c Base and diphosphate shown by Surrey et al., JACS 68, 113 (1946).

The acid-addition salts of the basic quinolines of Table A were converted into their free base form for use as intermediates in the preparation of the compounds of the invention. This was done by dissolving the salt in water, adding an alkaline agent such as ammonium hydroxide to the aqueous solution to liberate the basic quinoline, extracting the basic quinoline with an organic solvent such as chloroform and removing the organic solvent by distilling in vacuo to leave the basic quinoline.

B. 1-(lower-alkyl)-4-[lower-(quaternary-ammonium)-alkylimino]-quinoline salts The preparation of these compounds in the form of their acid-addition salts is illustrated by the following preparation of the hydriodide of 7-chloro-4-(2-diethylaminoethylimino)-1-methyl-1,4-dihydroquinoline omega-methiodide: To a solution containing 57 g. of 7-chloro-4-(2-diethylaminoethylamino)quinoline in 1200 cc. of acetone was added 236 g. of methyl iodide. The solution was warmed on a steam bath until crystals began to separate and then was set aside to cool overnight. The resulting crystalline product, 7-chloro-4-(2-diethylaminoethylimino)-1-methyl-1,4-dihydroquinoline omega-methiodide in the form of its hydriodide acid-addition salt, when collected and dried, weighed 114 g. (98% yield), M.P. 248-250° C. with decomposition. A small amount of this product when recrystallized from absolute ethanol yielded a sample of M.P. 250.4-251.6° C. dec. (corr.).

Analysis.—Calcd. for $C_{17}H_{25}ClIN_3 \cdot HI$: I−, 45.2; N, 7.48. Found: $H_2O$, 5.21; I−, 42.3 (44.6 dry basis); N, 6.99 (7.37 dry basis).

Alternatively, as discussed above, 7-chloro-4-(2-diethylaminoethylimino)-1-methyl-1,4-dihydroquinoline omega-methiodide hydriodide can be called 7-chloro-4-[2-(N,N-diethyl - N - methylammonium)ethylamino] - 1 - methylquinolinium diiodide or 7-chloro-4-(2-diethylaminoethylamino)quinoline bis(methiodide).

7 - chloro - 4 - (2 - diethylaminoethylimino) - 1-methyl-1,4-dihydroquinoline omega-methiodide can be prepared by reacting the corresponding 7-chloro-4-(2-diethylaminoethylimino) - 1 - methyl - 1,4 - dihydroquinoline with a molar equivalent of methyl iodide according to the procedure described in Example 2 or by reacting the hydriodide acid-addition salt of 7-chloro-4-(2-diethylaminoethylimino)-1-methyl-1,4-dihydroquinoline omega-methiodide with an acid-acceptor, as follows: To a solution of 2.8 g. of 7-chloro-4-(2-diethylaminoethylimino)-1-methyl-1,4-dihydroquinoline omega-methiodide hydriodide in methanol (using a minimum quantity of refluxing methanol) was added with stirring and warming a solution containing 0.28 g. of powdered potassium hydroxide in 5 cc. of methanol. A crystalline precipitate separated and the mixture was allowed to cool to room temperature. The precipitate was collected (wt. 1.3 g.), washed with methanol and recrystallized from methanol to yield the product, 7-chloro-4-(2-diethylaminoethylimino)-1-methyl-1,4-dihydroquinoline omega-methiodide [or can be named 7 - chloro - 4 - [2 - (N,N-diethyl - N - methylammoniumethylimino) - 1 - methyl-1,4-dihydroquinolinium iodide], M.P. 220-221° C.

Analysis.—Calcd. for $C_{17}H_{25}ClIN_3$: I−, 29.24. Found: I−, 29.37.

A sample of the above methiodide (M.P. 220-221° C.) when mixed with a sample of the methiodide of Example 2 (M.P. 218.6-219.4° C. corr.), which was obtained by reacting 7-chloro-4-(2-diethylaminoimino)-1-methyl-1,4-dihydroquinoline with a molar equivalent of methyl iodide, melted at 220-221° C.

7 - chloro - 4 - (2 - diethylaminoethylimino) - 1-methyl-1,4-dihydroquinoline omega-methochloride hydrochloride was formed from the corresponding methochloride hydriodide as follows: One hundred ninety-four grams of the methiodide hydriodide were dissolved in 1500 cc. of 54% aqueous ethanol by warming. The warm solution was passed rapidly over a column (3 feet long and 2½ inches in diameter) of 875 g. of an ion-exchange resin saturated with chloride ions (such as Rohm and Haas Amberlite® IRA-400 ion-exchange resin) and the column was partially eluted with one liter of 95% ethanol. The combined eluant was passed over the column a second time more slowly and the column eluted free of halide ion with absolute ethanol. The solvent in the eluant was removed by distilling in vacuo and the last traces of water were removed azeotropically with benzene and absolute ethanol. The solid residue was recrystallized from 95% ethanol, yielding the product, 7-chloro-4-(2-diethylaminoethylimino)-1-methyl-1,4-dihydroquinoline omega-methochloride hydrochloride, M.P. 221.4-222.2° C. (corr.) after dried in a vacuum oven for ninety-six hours at 110° C. and 1 mm.

Analysis.—Calcd. for $C_{17}H_{25}Cl_2N_3 \cdot HCl$: Cl−, 18.72. Found: $H_2O$, 1.15; Cl−, 18.30 (18.51 D.B.).

Alternatively, 7-chloro-4-(2-diethylaminoethylimino)-1-methyl-1,4-dihydroquinoline omega-methochloride hydrochloride was prepared directly, as follows: Ten grams of 7-chloro-4-(2-diethylaminoethylamino)quinoline were dissolved in 100 cc. of dry acetone. Methyl chloride was bubbled into the solution until 20 g. was taken up. The solution was added to a 300 cc. autoclave and heated at 98-103° C. for about eighteen hours. The thick viscous paste in the bomb was removed and collected by filtration to give 13.5 g. (100% yield) of the product, M.P. 216-223° C. (uncorr.). The product, 7-chloro-4-(2-diethylaminoethylimino)-1-methyl-1,4-dihydroquinoline omega-methochloride hydrochloride was recrystallized as above from 95% ethanol.

Other 1-(lower-alkyl)-4-[lower-(quaternary-ammonium)-alkylimino]-quinoline salts that can be prepared following the above procedure using the appropriate 4-(tertiary-aminoalkylamino)-quinoline and lower-alkyl ester of a strong acid include: 3,7-dichloro-4-(2-diethylaminoethylimino)-1-methyl-1,4-dihydroquinoline omega-methochloride hydrochloride using 3,7-dichloro-4-(2-diethylaminoethylamino)quinoline and methyl chloride; 6,7-dichloro - 4 - [2 - (1 - piperidyl)ethylimino] - 1 - ethyl-1,4-dihydroquinoline omega-ethobromide hydrobromide using 6,7 - dichloro-4-[2-(1-piperidyl)ethylamino]quinoline and ethyl bromide; 7-bromo-4-(2-di-n-hexylaminoethylimino)-1-methyl-1,4-dihydroquinoline omega-methiodide hydriodide using 7-bromo-4-(2-di-n-hexylaminoethylamino)quinoline and methyl iodide; 8-chloro-4-[3-(1 - pyrrolidyl)propylimino] - 1 - isopropyl - 1,4 - dihydroquinoline omega-isopropochloride hydrochloride using 8-chloro-4-[3-(1-pyrrolidyl)propylamino]quinoline and isopropyl chloride; 4-(2-diethylaminoethylimino)-1-n-propyl-7-trifluoromethyl-1,4-dihydroquinoline omega-n-propiodide hydriodide using 4-(2-diethylaminoethylamino)-7-trifluoromethylquinoline and n-propyl iodide; 4-[2 - (N - ethyl - N - 2 - hydroxyethylamino)ethylimino]-1-n-hexyl-3-nitro-1,4-dihydroquinoline omega-n-hexiodide hydriodide using 4-[2-(N-ethyl-N-2-hydroxyethylamino)ethylamino]-3-nitroquinoline and n-hexyl iodide; 6,8-dimethoxy - 1 - ethyl - 4 - [2 - (4 - methyl - 1 - piperidyl)ethylimino]-1,4-dihydroquinoline omega(etho-para-toluenesulfonate) para-toluenesulfonate using 6,8-dimethoxy-4-[2-(4-methyl - 1 - piperidyl)ethylamino]quinoline and ethyl para-toluenesulfonate; 4-[2-(N-benzyl-N-ethylamino)ethylimino] - 8 - n - butoxy - 1 - isobutyl -1,4 - dihydroquinoline omega-isobutobromide hydrobromide using 4-[2-(N-benzyl-N-ethylamino)ethylamino]-8 - n - butoxyquinoline and isobutyl bromide; 4-(2-dimethylaminoethylimino) - 6 - n - hexoxy - 1 - methyl - 1,4 - dihydroquinoline omega-methobromide hydrobromide using 4-(2-dimethylaminoethylamino) - 6 - n - hexoxyquinoline and methyl bromide; 4-[3-(N-cyclohexyl-N-methylamino)propylimino] - 1 - ethyl - 7 - methylmercapto - 1,4 - dihydroquinoline omega-ethosulfate sulfate using 4-[3-(N-cyclohexyl - N - methylamino)propylamino] - 7 - methylmercaptoquinoline and ethyl sulfate; 1-ethyl-4-[2-(N-ethyl N - methylamino)ethylimino] - 8 - isobutylmercapto - 1,4-dihydroquinoline omega-ethochloride hydrochloride using 4 - [2 - (N - ethyl - N - methylamino)ethylamino] - 8-isobutylmercaptoquinoline and ethyl chloride; 7-chloro-4 - (2 - diethylaminoethylimino) - 6 - methoxy - 1-methyl-1,4-dihydroquinoline omega-methiodide hydriodide using 7-chloro-4-(2-diethylaminoethylamino)-6-methoxyquinoline and methyl iodide; and the like. These compounds are converted into their base form by reaction with a molar equivalent of an alkaline agent according to the procedure given above for the conversion of 7-chloro-4 - (2 - diethylaminoethylimino) - 1 - methyl - 1,4 - dihydroquinoline omega-methiodide hydriodide into its corresponding methiodide by reaction with an acid-acceptor, such as potassium hydroxide in methanol. Alternatively, these compounds in base form can be prepared according to the procedure described in Example 2 by reacting the appropriate 4-(tertiary-aminoalkylimino)-1-(lower-alkyl)1,4-dihydroquinoline with a lower-alkyl ester of a strong inorganic or organic sulfonic acid.

EXAMPLE 2

*7-chloro-4-(2-diethylaminoethylimino)-1-methyl-1,4-di-hydroquinoline omega-methiodide*

A solution containing 5.8 g. of 7-chloro-4-(2-diethylaminoethylimino)-1-methyl-1,4-dihydroquinoline and 10 g. of methyl iodide in 50 cc. of absolute ethanol was stirred at room temperature for about three hours. The solid which separated was collected, washed with acetone and recrystallized from methanol to yield 7 g. of product, 7 - chloro - 4 - (2 - diethylaminoethylimino) - 1 - methyl-1,4-dihydroquinoline omega-methiodide, M.P. 218.6–219.4° C. (corr.).

*Analysis.*—Calcd. for $C_{17}H_{25}ClIN_3$: I⁻, 29.24; N, 9.68. Found: I⁻, 29.1; N, 9.69.

By stirring an aqueous solution of 7-chloro-4-(2-diethylaminoethylimino) - 1 - methyl - 1,4 - dihydroquinoline omega-methiodide with an excess of silver oxide, filtering the suspension, and neutralizing the filtrate with at least two molar equivalents of sulfuric acid, phosphoric acid, acetic acid, lactic acid, tartaric acid, quinic acid or methanesulfonic acid, there can be obtained, respectively, 7 - chloro - 4 - (2 - diethylaminoethylimino) - 1 - methyl-1,4 - dihydroquinoline omega - methosulfate sulfate, 7-chloro - 4 - (2 - diethylaminoethylimino) - 1 - methyl-1,4-dihydroquinoline omega-methophosphate phosphate, 7 - chloro - 4 - (2 - diethylaminoethylimino) - 1 - methyl-1,4 - dihydroquinoline omega - methoacetate acetate, 7-chloro - 4 - (2 - diethylaminoethylimino) - 1 - methyl-1,4 - dihydroquinoline omega - metholactate lactate, 7-chloro - 4 - (2 - diethylaminoethylimino) - 1 - methyl-1,4-dihydroquinoline omega-methotartrate tartrate, 7-chloro - 4 - (2 - diethylaminoethylimino) - 1 - methyl-1,4-dihydroquinoline omega-methoquinate quinate, or 7-chloro - 4 - (2 - diethylaminoethylimino) - 1 - methyl-1,4 - dihydroquinoline omega - methomethanesulfonate methanesulfonate. Treatment of each of these compounds with one molar equivalent of an acid-acceptor, e.g., potassium hydroxide, as in Example 1B, yields the 7 - chloro - 4 - (2 - diethylaminoethylimino) - 1 - methyl-1,4-dihydroquinoline quaternary ammonium salt, e.g., omega-methosulfate, etc.

A small sample of 7-chloro-4-(2-diethylaminoethylimino)-1-methyl-1,4-dihydroquinoline omega-methiodide was dissolved in ethanol with enough water to effect dissolution; aqueous hydrogen iodide (48%) was added; and the resulting precipitate was collected, washed with acetone and found to melt at 256–258° C. (uncorr.) with decomposition. This product, the hydriodide of 7-chloro-4-(2-diethylaminoethylimino) - 1 - methyl - 1,4 - dihydroquinoline omega-methiodide, is the same as the product obtained in Example 1B by reacting 7-chloro-4-(2-diethylaminoethylamino)quinoline with two molar equivalents of methyl iodide, as evidenced by no depression of a mixed melting point of the two samples.

EXAMPLE 3

*7-chloro-4-(2-dimethylaminoethylimino)-1-methyl-1,4-dihydroquinoline omega-methiodide hydriodide*

This preparation was carried out following the procedure described in Example 1B using 5.0 g. of 7-chloro-4-(2-dimethylaminoethylamino)quinoline and 11.4 g. of methyl iodide, yielding 6.56 g. (61% yield) of the product, 7-chloro-4-(2-dimethylaminoethylimino)-1-methyl-1,4-dihydroquinoline omega-methiodide hydriodide, M.P. 267.0° C. (corr.). (softened at 252.2° C.).

*Analysis.*—Calcd. for $C_{15}H_{21}ClIN_3 \cdot HI$: I⁻, 47.6; N, 7.87. Found: I⁻, 47.2; N, 7.51.

7 - chloro - 4 - (2 - dimethylaminoethylimino) - 1 - methyl - 1,4 - dihydroquinoline omega-methiodide is formed from the above described omega-methiodide hydriodide by reaction with an acid-acceptor following the procedure described in Example 1B.

EXAMPLE 4

A. *7-chloro-4-(2-diethylaminoethylimino)-1-ethyl-1,4-dihydroquinoline omega-ethiodide hydriodide*

A solution containing 5 g. of 7-chloro-4-(2-diethylaminoethylamino)quinoline, 4 cc. of ethyl iodide and 50 cc. of acetonitrile was refluxed for seventeen hours. After removal of the solvent in vacuo, the residual oil was triturated, thereby yielding a solid product which was recrystallized from absolute ethanol to give 9.9 g. (92% yield) of the product, 7-chloro-4-(2-diethylaminoethylimino) - 1 - ethyl - 1,4 - dihydroquinoline omega-ethiodide hydriodide, as bright yellow prisms, M.P. 210.0–212.0° C. (corr.).

*Analysis.*—Calcd. for $C_{19}H_{29}ClIN_3 \cdot HI$: I⁻, 43.0; N, 7.13. Found: I⁻, 42.7; N, 6.89.

7 - chloro - 4 - (2 - diethylaminoethylimino) - 1 - ethyl-1,4-dihydroquinoline omega-ethiodide is obtained from the above corresponding omega-ethiodide hydriodide by reacting it with an acid-acceptor.

B. *7-chloro-4-(2-diethylaminoethylimino)-1-ethyl-1,4-dihydroquinoline omega-ethochloride hydrochloride*

An aqueous solution containing 31.9 g. of 7-chloro-4-(2 - diethylaminoethylimino) - 1 - ethyl - 1,4 - dihydroquinoline omega-ethiodide hydriodide was passed over a column (one inch in diameter and two feet in length) of 135 g. of an ion-exchange resin saturated with chloride ions (such as Amberlite® IRA–400). The column was eluted with absolute ethanol until no further test for halide ion could be obtained in the eluant. The solvent was removed in vacuo, the last traces of water being removed azeotropically with benzene, and the resulting oily residue was triturated with acetone to yield a solid which was collected and recrystallized from isopropanol-acetone to yield 18.1 g. (79% yield) of the product, 7-chloro - 4 - (2 - diethylaminoethylimino) - 1 - ethyl-1,4-dihydroquinoline omega-ethochloride hydrochloride monohydrate, M.P. indefinite with softening at 178° C.

*Analysis.*—Calcd. for $C_{19}H_{29}Cl_2N_3 \cdot HCl \cdot H_2O$: Cl⁻, 16.69; N, 9.89; $H_2O$, 4.24. Found: Cl⁻, 16.50; N, 9.85; $H_2O$, 4.62.

EXAMPLE 5

*7-chloro-4-(2-diethylaminoethylimino)-1-methyl-1,4-dihydroquinoline omega-(2-chlorobenziodide) hydriodide*

To a solution containing 6 g. of sodium iodide in 75 cc. of acetone was added 6.5 g. of 2-chlorobenzyl chloride and the solution was allowed to stand at room temperature for about thirty minutes. The solid which separated was removed by filtration and to the filtrate containing 2-chlorobenzyl iodide was added 5.8 g. of 7-chloro - 4 - (2 - diethylaminoethylimino) - 1 - methyl-1,4-dihydroquinoline. The solution was allowed to stand for six days, after which time there had separated 5 g. of a yellow solid which was recrystallized twice from ethanol-methanol to give 2 g. of the product, 7-chloro - 4 - (2 - diehtylaminoethylimino) - 1 - methyl-1,4 - dihydroquinoline omega - (2 - chlorobenziodide) hydriodide, M.P. 182.0–185.2° C. (corr.).

*Analysis.*—Calcd. for $C_{23}H_{28}Cl_2IN_3 \cdot HI$: I⁻, 37.76; N, 6.25. Found: I⁻, 37.4; N, 6.10.

7 - chloro - 4 - (2 - diethylaminoethylimino) - 1 - methyl - 1,4 - dihydroquinoline omega - (2 - chlorobenziodide) is obtained by reacting the above omega-(2-chlorobenziodide) hydriodide with an acid-acceptor according to the procedure described in Example 1B.

By substitution of 2-chlorobenzyl iodide in the preceding example by a molar equivalent amount of 3-nitrobenzyl iodide, 2-methoxybenzyl chloride, 2,4-dimethoxybenzyl bromide, 2,4,6-trimethoxybenzyl chloride, 3-ethylbenzyl iodide, 2,4-dibromobenzyl bromide, 2-chloro-4-methoxybenzyl chloride, 2,4,6-trichlorobenzyl chloride, 3-trifluoromethylbenzyl chloride, 2-methylmercaptobenzyl iodide, 2-chlorobenzyl chloride, isobutyl bromide, n-hexyl iodide or ethyl chloride, there can be obtained, respectively, 7 - chloro - 4 - (2 - diethylaminoethylimino) - 1 - methyl - 1,4 - dihydroquinoline omega-(3-nitrobenziodide) hydriodide, 7-chloro-4-(2-diethylaminoethylimino) - 1 - methyl - 1,4 - dihydroquinoline omega - (2 - methoxybenzochloride) hydrochloride, 7-chloro - 4 - (2 - diethylaminoethylimino) - 1 - methyl-1,4 - dihydroquinoline omega - (2,4 - dimethoxybenzobromide) hydrobromide, 7-chloro-4-(2-diethylaminoethylimino) - 1 - methyl - 1,4 - dihydroquinoline omega-(2,4,6-trimethoxybenzochloride) hydrochloride, 7-chloro-4 - (2 - diethylaminoethylimino) - 1 - methyl - 1,4 - dihydroquinoline omega-(3-ethylbenziodide) hydriodide, 7 - chloro - 4 - (2 - diethylaminoethylimino) - 1 - methyl - 1,4 - dihydroquinoline omega - (2,4 - dibromobenzobromide) hydrobromide, 7 - chloro - 4 - (2 - diethylaminoethylimino) - 1 - methyl - 1,4 - dihydroquinoline omega - (2 - chloro - 4 - methoxybenzochloride) hydrochloride, 7 - chloro - 4 - (2 - diethylaminoethylimino)-1 - methyl - 1,4 - dihydroquinoline omega - (2,4,6-trichlorobenzochloride) hydrochloride, 7 - chloro - 4 - (2 - diethylaminoethylimino) - 1 - methyl - 1,4 - dihydroquinoline omega - (3 - trifluoromethylbenzochloride) hydrochloride, 7 - chloro - 4 - (2 - diethylaminoethylimino) - 1 - methyl - 1,4 - dihydroquinoline omega - (2-methylmercaptobenziodide) hydriodide, 7 - chloro - 4 - (2 - diethylaminoethylimino) - 1 - methyl - 1,4 - dihydroquinoline omega - (2 - chlorobenzochloride) hydrochloride, 7 - chloro - 4 - (2 - diethylaminoethylimino) - 1 - methyl - 1,4 - dihydroquinoline omega - isobutobromide hydrobromide, 7 - chloro - 4 - (2 - diethylaminoethylimino) - 1 - methyl - 1,4 - dihydroquinoline omega - n-hexiodide hydriodide or 7 - chloro - 4 - (2 - diethylaminoethylimino) - 1 - methyl - 1,4 - dihydroquinoline omega-ethochloride hydrochloride. The corresponding compounds in the form of their bases can be obtained by reaction with an acid-acceptor according to the procedure given in Example 1B.

EXAMPLE 6

*7 - chloro - 4 - [2 - (4 - morpholinyl)ethylimino] - 1-methyl - 1,4 - dihydroquinoline omega - methiodide hydriodide*

This preparation was carried out following the procedure described in Example 1B using 5.0 g. of 7-chloro-4 - [2 - (4 - morpholinyl)ethylamino]quinoline and 11.4 g. of methyl iodide. There was thus obtained 5.24 g. (53% yield) of the product, 7-chloro-4-[2-(4-morpholinyl)ethylimino] - 1 - methyl - 1,4 - dihydroquinoline omega-methiodide hydriodide, M.P. 259.0–261.4° C. (corr.) with decomposition.

*Analysis.*—Calcd. for $C_{17}H_{23}ClIN_3O \cdot HI$: I⁻, 44.1; N, 7.30. Found: I⁻, 43.6; N, 7.17.

EXAMPLE 7

*5-chloro-4-(2-dimethylaminoethylimino)-1-methyl-1,4-dihydroquinoline omega-methiodide hydriodide*

Following the procedure described in Example 1B using 3.0 g. of 5-chloro-4-(2-dimethylaminoethylamino)quinoline and 14.7 g. of methyl iodide there was obtained 5.0 g. (80% yield) of the product, 5-chloro-4-(2-dimethylaminoethylimino)-1-methyl-1,4-dihydroquinoline omega-methiodide hydriodide, M.P. 232.2–233.4° C. (corr.) with decomposition.

*Analysis.*—Calcd. for $C_{15}H_{21}ClIN_3 \cdot HI$: I⁻, 47.6; N, 7.88. Found: $H_2O$, 3.32; I⁻, 48.3 (D.B.); N, 7.75 (D.B.).

EXAMPLE 8

*5-chloro-4-(2-diethylaminoethylimino)-1-methyl-1,4-dihydroquinoline omega-methobromide hydrobromide*

To a refluxing solution containing 5.0 g. of 5-chloro-4-(2-diethylaminoethylamino)quinoline in 150 cc. of acetonitrile was added methyl bromide in a slow stream with stirring for about one hour. The reaction mixture was allowed to cool and stirred for an additional hour whereupon a solid separated. This solid was collected, washed with acetone and dried at about 100° C., yielding 2.5 g. (30% yield) of product, 5-chloro-4-(2-diethylaminoethylimino)-1-methyl - 1,4 - dihydroquinoline omega-methobromide hydrobromide, M.P. 235.0–238.0° C. (corr.).

*Analysis.*—Calcd. for $C_{17}H_{25}BrClN_3 \cdot HBr$: Br⁻, 34.24; N, 9.00. Found: Br⁻, 33.80; N, 8.72.

5-chloro-4-(2-diethylaminoethylimino)-1-methyl-1,4-dihydroquinoline omega-methobromide is obtained by reacting the above omega-methobromide hydrobromide with an acid-acceptor.

EXAMPLE 9

*5-chloro-4-(2-di-n-butylaminoethylimino)-1-methyl-1,4-dihydroquinoline omega-methiodide hydriodide*

This preparation was carried out following the procedure described in Example 1B using 14 g. of 5-chloro-4-(2-di-n-butylaminoethylamino)quinoline, 5cc. of methyl iodide and 75 cc. of acetonitrile, thereby yielding 10 g. (35% yield) of the product, 5-chloro-4-(2-di-n-butylaminoethylimino)-1-methyl-1,4-dihydroquinoline omega-methiodide hydriodide, M.P. 208.3–209.7° C. (corr.).

*Analysis.*—Calcd. for $C_{21}H_{33}ClIN_3 \cdot HI$: I⁻, 41.02; N, 6.79. Found: $H_2O$, 2.03; I⁻, 41.15 (D.B.); N, 6.65 (D.B.).

5-chloro-4-(2-di-n-butylaminoethylimino)-1-methyl-1,4-dihydroquinoline omega-methiodide is obtained by reacting the above omega-methiodide hydriodide with an acid-acceptor.

EXAMPLE 10

*3-chloro-4-(2-diethylaminoethylimino)-1-methyl-1,4-dihydroquinoline omega-methochloride hydrochloride*

A solution of 8.6 g. of 3-chloro-4-(2-diethylaminoethylamino)quinoline and 14.2 g. of methyl iodide in 50 cc. of absolute ethanol was allowed to stand at room temperature for three days. The solid which precipitated was collected, washed with ethanol and dried at 90° C. for about two hours to yield 12 g. (86% yield) of 3-chloro-4-(2-diethylaminoethylimino)-1-methyl - 1,4 - dihydroquinoline omega-methiodide hydriodide, M.P. 228–231° C. (uncorr.). This methiodide hydriodide was recrystallized from methanol, dried at 90° C. for one hour and then dissolved in a mixture of 100 cc. of methanol and 25 cc. of water. The solution was passed through a column of 75 g. of an ion-exchange resin containing an excess of chloride ions (such as Amberlite ® IRA–400). The resulting solution was evaporated in vacuo to yield 6.5 g. of solid which was recrystallized from isopropanol and dried at 90° C. in vacuo for twenty-four hours to yield the product, 3-chloro-4-(2-diethylaminoethylimino)-1-methyl -1,4- dihydroquinoline omega-methochloride hydrochloride, M.P. 256.0–258.8° C. (corr.).

*Analysis.*—Calcd. for $C_{17}H_{25}Cl_2N_3 \cdot HCl$: Cl⁻, 18.74; N, 11.10. Found: Cl⁻, 18.52; N, 10.80.

3-chloro-4-(2-diethylaminoethylimino)-1-methyl-1,4-dihydroquinoline omega-methochloride is obtained by reacting the above omega-methochloride hydrochloride with an acid-acceptor.

EXAMPLE 11

*7-chloro-4-(3-dimethylaminopropylimino)-1-methyl-1,4-dihydroquinoline omega-methiodide hydriodide*

Following the procedure described in Example 1B using 3.0 g. of 7-chloro-4-(3-dimethylaminopropylamino)quinoline and 13.6 g. of methyl iodide, there was obtained 6.0 g. (97% yield) of the product, 7-chloro-4-(3-dimethylaminopropylimino)-1-methyl-1,4-dihydroquinoline omega-methiodide hydriodide, M.P. 266.4–268.4° C. (corr.) with decomposition.

*Analysis.*—Calcd. for $C_{16}H_{23}ClIN_3 \cdot HI$: $I^-$, 46.3; N, 7.67. Found: $I^-$, 46.0; N, 7.55.

7-chloro-4-(3-dimethylaminopropylimino) - 1 - methyl-1,4-dihydroquinoline omega-methiodide is obtained by reacting the above omega-methiodide hydriodide with an acid-acceptor.

EXAMPLE 12

*4-(2-diethylaminoethylimino)-6-methoxy-1-methyl-1,4-dihydroquinoline omega-methiodide hydriodide*

This preparation was carried out following the procedure described in Example 1B using 5.0 g. of 4-(2-diethylaminoethylamino)-6-methoxyquinoline and 11.4 g. of methyl iodide. There was thus obtained 9.0 g. (88% yield) of the product, 4-(2-diethylaminoethylimino)-6-methoxy-1-methyl-1,4-dihydroquinoline omega-methiodide hydriodide, M.P. 230.4–235.2° C. (corr.) with decomposition.

*Analysis.*—Calcd. for $C_{18}H_{28}IN_3O \cdot HI$: $I^-$, 45.6; N, 7.54. Found: $I^-$, 45.2; N, 7.29.

4-(2-diethylaminoethylimino)-6-methoxy-1-methyl-1,4-dihydroquinoline omega-methiodide is obtained by reacting the above omega-methiodide hydriodide with an acid-acceptor.

EXAMPLE 13

*4-(2-diethylaminoethylimino)-8-methoxy-1-methyl-1,4-dihydroquinoline omega-methiodide hydriodide*

This preparation was carried out following the procedure described in Example 1B using 7.0 g. of 4-(2-diethylaminoethylamino)-8-methoxyquinoline and 15.9 g. of methyl iodide. There was thus obtained 12.5 g. (78% yield) of the product, 4-(2-diethylaminoethylimino)-8-methoxy-1-methyl-1,4-dihydroquinoline omega-methiodide hydriodide, M.P. 218.6–225.4° C. (corr.) with decomposition.

*Analysis.*—Calcd. for $C_{18}H_{28}IN_3O \cdot HI$: $I^-$, 45.6; N, 7.54. Found: $I^-$, 45.3; N, 7.29.

4-(2-diethylaminoethylimino)-8-methoxy-1-methyl-1,4-dihydroquinoline omega-methiodide is obtained by reacting the above omega-methiodide hydriodide with an acid-acceptor.

EXAMPLE 14

*7-chloro-4-(3-diethylaminopropylimino)-1-methyl-1,4-dihydroquinoline omega-methiodide hydriodide*

This preparation was carried out following the procedure described in Example 1B using 2 g. of 7-chloro-4-(3-diethylaminopropylamino)quinoline, 2.5 cc. of methyl iodide, 50 cc. of acetonitrile and a reflux period of twenty-four hours. There was thus obtained 2.7 g. (67% yield) of the product, 7-chloro-4-(3-diethylaminopropylimino)-1-methyl-1,4-dihydroquinoline omega-methiodide hydriodide, M.P. 233.7–243.5° C. (corr.).

*Analysis.*—Calcd. for $C_{18}H_{27}ClIN_3 \cdot HI$: $I^-$, 44.10; N, 7.30. Found: $I^-$, 44.16; N, 7.08.

7-chloro-4-(3-diethylaminopropylimino)-1-methyl - 1,4-dihydroquinoline omega-methiodide is obtained by reacting the above omega-methiodide hydriodide with an acid-acceptor.

EXAMPLE 15

*4-(2-diethylaminoethylimino)-1,2-dimethyl-1,4-dihydroquinoline omega-methochloride hydrochloride*

To a solution of 14.9 g. of 4-(2-diethylaminoethylamino)-2-methylquinoline in 50 ml. of ethanol was added 41 g. of methyl iodide. After standing for five hours, the solid product was collected and dried at 110° C. in vacuo (1 mm.) for fifteen hours. Recrystallization of the solid yielded 19 g. of 4-(2-diethylaminoethylimino)-1,2-dimethyl-1,4-dihydroquinoline omega-methiodide hydriodide, M.P. 259–261° C. with decomposition.

*Analysis.*—Calcd. for $C_{18}H_{28}IN_3 \cdot HI$: $I^-$, 46.9. Found: $I^-$, 46.3.

Treatment of the above omega-methiodide hydriodide with an acid-acceptor as in Example 1B or treatment of 4 - (2 - diethylaminoethylimino) - 1,2 - dimethyl - 1,4 - dihydroquinoline with metyl iodide as in Example 2 yields 4 - (2 - diethylaminoethylimino) - 1,2 - dimethyl - 1,4 - dihydroquinoline omega-methiodide.

The corresponding omega-methochloride hydrochloride was prepared by dissolving 19 g. of the above omega-methiodide hydriodide in water with warming and passing the aqueous solution through a column of 88 g. of an ion-exchange resin saturated with chloride ions (Amberlite ® IRA–400). After washing the column with 200 ml. of ethanol, the combined eluate was distilled in vacuo, the last traces of water being removed azeotropically with benzene-ethanol. The residual solid was recrystallized twice from isopropanol-acetone and dried at 85° C. for ninety-six hours to yield 8 g. of product, 4 - (2 - diethylaminoethylimino) - 1,2 - dimethyl - 1,4 - dihydroquinoline omega - methochloride hydrochloride, M.P. 238.2–242.4° C. (corr.) with decomposition.

*Analysis.*—Calcd. for $C_{18}H_{28}ClN_3 \cdot HCl$: $Cl^-$, 19.78; N, 11.73. Found: $H_2O$, 1.54; $Cl^-$, 19.75 (D.B.); N, 11.60 (D.B.).

By substitution of the 4-(2-diethylaminoethylamino)-2-methylquinoline in the preceding example by a molar equivalent of 4-(2-diethylaminoethylamino)-2-n-butylquinoline, 4-[3-(1-piperidyl)propylamino]-2-ethylquinoline or 7-chloro-4-(2-diethylaminoethylamino)-2-methylquinoline, there can be obtained 2-n-butyl-4-(2-diethylaminoethylimino)-1-methyl-1,4-dihydroquinoline omega-methochloride hydrochloride, 2-ethyl-1-methyl-4-[3-(1-piperidyl) - propylimino] - 1,4 - dihydroquinoline omega-methochloride hydrochloride or 7-chloro-1,2-dimethyl-4-(2-diethylaminoethylamino)-1,4-dihydroquinoline omega-methochloride hydrochloride, respectively.

EXAMPLE 16

*4-(2-diethylaminoethylimino)-1,3-dimethyl-1,4-dihydroquinoline omega-methochloride hydrochloride*

Following the procedure described in Example 15 using 15 g. of 4-(2-diethylaminoethylamino)-3-methylquinoline, 25 cc. of ethanol and 10 cc. of methyl iodide, there was obtained 17 g. of 4-(2-diethylaminoethylimino)-1,3-dimethyl-1,4-dihydroquinoline omega-methiodide hydriodide, M.P. 210–213° C.

*Analysis.*—Calcd. for $C_{18}H_{28}IN_3 \cdot HI$: $I^-$, 46.9. Found: $I^-$, 46.3.

Using 16 g. of the above omega-methiodide hydriodide and following the procedure described in Example 15, there was obtained 4.4 g. of 4-(2-diethylaminoethylimino)-1,3-dimethyl-1,4-dihydroquinoline omega-methochloride hydrochloride, M.P. 264.4–267.8° C. (corr.) with decomposition when recrystallized three times from ethanol.

*Analysis.*—Calcd. for $C_{18}H_{28}ClN_3 \cdot HCl$: $Cl^-$, 19.79; N, 11.73. Found: $H_2O$, 1.75; $Cl^-$, 19.65 (D.B.); N, 11.62 (D.B.).

By substitution of the 4-(2-diethylaminoethylamino)-3-methylquinoline in the preceding example by a molar equivalent of 4-(2-diethylaminoethylamino)-7-methylquinoline or 4-(2-diethylaminoethylamino)-8-n-hexylquinoline, there can be obtained 4-(2-diethylaminoethyl-imino)-1,7-dimethyl-1,4-dihydroquinoline omega-methochloride hydrochloride or 4-(2-diethylaminoethylimino)-8-n-hexyl-1-methyl-1,4-dihydroquinoline omega-methochloride hydrochloride, respectively.

EXAMPLE 17

*7-chloro-4-(2-diethylaminoethylimino)-1,3-dimethyl-1,4-dihydroquinoline omega-methochloride hydrochloride*

This preparation was carried out following the procedure described in Example 15. Using 8.8 g. of 7-chloro-4-(2-diethylaminoethylamino)-3-methylquinoline, 25 cc. of ethanol and 10 cc. of methyl iodide, there was first obtained 16.3 g. of 7-chloro-4-(2-diethylaminoethylimino)-1,3-dimethyl-1,4-dihydroquinoline omega-methiodide hydriodide, M.P. 246–248° C. with decomposition.

Analysis.—Calcd. for $C_{18}H_{27}ClIN_3 \cdot HI$: $I^-$, 44.1. Found: $I^-$, 44.1.

Using 15.1 g. of the above omega-methiodide hydroiodide there was obtained 5.6 g. of 7-chloro-4-(2-diethylaminoethylimino) - 1,3 - dimethyl - 1,4 - dihydroquinoline omega-methochloride hydrochloride, M.P. 235.6–238.0° C. (corr.) with decompositon when dried at 85° C. for seventy-two hours.

Analysis.—Calcd. for $C_{18}H_{27}Cl_2N_3 \cdot HCl$: N, 10.69; $Cl^-$, 18.05. Found: $H_2O$, 3.02; N, 10.54 (D.B.); $Cl^-$, 17.74 (D.B.).

EXAMPLE 18

*4-(2-diethylaminoethylimino)-1-methyl-1,4-dihydroquinoline omega-methiodide hydriodide*

Following the procedure described in Example 1B using 1.85 g. of 4-(2-diethylaminoethylamino)quinoline, 30 cc. of ethanol and 6 cc. of methyl iodide, there was obtained 3.55 g. of 4-(2-diethylaminoethylimino)-1-methyl-1,4-dihydroquinoline omega-methiodide hydriodide, M.P. 215–235° (corr.) when recrystallized from absolute ethanol.

Analysis.—Calcd. for $C_{17}H_{26}IN_3 \cdot HI$: $I^-$, 48.2; N, 7.97. Found: $H_2O$, 3.94; $I^-$, 48.1 (D.B.); N, 7.78 (D.B.).

Pharmacological evaluation of the compounds of the invention by the standard nictitating membrane test in cats has shown that these substances have ganglionic blocking effects which indicates their usefulness in the treatment of hypertension. They have ganglionic blocking activity in the range of that possessed by hexamethonium salts, some of them being from two to six times as active as hexamethonium bromide. They have also been shown to possess hypotensive properties when tested by other standard tests, for example, by the serial carotid occlusion response in dogs anesthetized with sodium barbital or morphine-chloralose, by administration intravenously or orally in unanesthetized dogs, and by the renal hypertensive rat test.

The compounds of the invention can be formulated for use in the same way as conventional ganglionic blocking and hypotensive agents, such as hexamethonium salts and reserpine preparations, and indeed can be used advantageously in combination with such agents. They can be formulated into tablets or capsules for oral administration or dissolved under sterile conditions for parenteral injection.

I claim:

1. A composition of matter selected from the group consisting of: (a) a 1-(lower-alkyl)-4-(quaternary-ammonium-alkylimino)-1,4-dihydroquinoline having the structural formula

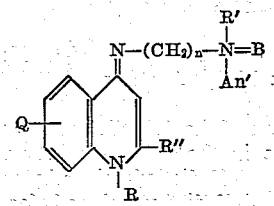

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, n is an integer from 2 to 3, N=B is lower-tertiary-amino selected from the group consisting of di-(lower-alkyl)amino, N-(lower-alkyl)-N-(lower-cycloalkyl)amino, N-(lower-alkyl)-N-(lower-hydroxyalkyl)-amino, N-(lower-alkyl)-N-[(monocarbocyclic-aryl)methyl]amino, 1-piperidyl, (lower-alkylated)-1-piperidyl, 1-pyrrolidyl, (lower-alkylated)-1-pyrrolidyl and 4-morpholinyl, An' is a pharmacodynamically acceptable anion, R is lower-alkyl, R' is a member selected from the group consisting of lower-alkyl and (monocarbocyclic-aryl)methyl, and R'' is a member selected from the group consisting of H and lower-alkyl, wherein (monocarbocyclic-aryl)methyl in each instance represents a member selected from the group consisting of benzyl, nitrobenzyl, (lower-alkoxylated)-benzyl, (lower-alkylated) - benzyl, halogenated-benzyl, trifluoromethylbenzyl and (lower-alkylmercapto)benzyl; and, (b) pharmacodynamically acceptable acid-addition salts thereof.

2. A pharmacodynamically acceptable acid-addition salt of a 1-(lower-alkyl)-7-halo-4-(quaternary-ammonium-alkylimino)-1,4-dihydroquinoline having in free base form the structural formula

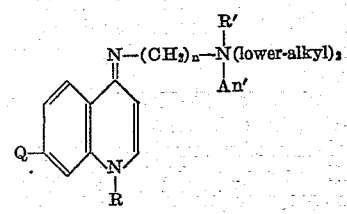

where Q is halo, n is an integer from 2 to 3, An' is a pharmacodynamically acceptable anion, and R and R' are each lower-alkyl.

3. An acid-addition salt of a 1-(lower-alkyl)-2-(lower-alkyl)-4-(quaternary-ammonium-alkylimino) - 1,4 - dihydroquinoline having the structural formula

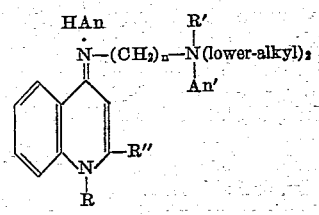

where n is an integer from 2 to 3, An and An' are pharmacodynamically acceptable anions, and R, R' and R'' are each lower-alkyl.

4. An acid-addition salt of a 1-(lower-alkyl)-3-halo-4-(quaternary-ammonium-alkylimino)-1,4-dihydroquinoline having the structural formula

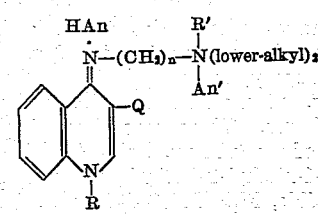

where Q is halo, n is an integer from 2 to 3, An and An' are pharmacodynamically acceptable anions, and R and R' are each lower-alkyl.

5. A hydrohalide of 7-chloro-4-(2-diethylaminoethylimino)-1-methyl-1,4-dihydroquinoline omega-methohalide.

6. 7-chloro-4-(2-diethylaminoethylimino) - 1 - methyl-1,4-dihydroquinoline omega-methohalide.

7. A hydrohalide of 7-chloro-4-(2-dimethylaminoethylimino)-1-methyl-1,4-dihydroquinoline omega-methohalide.

8. A hydrohalide of 1,2-dimethyl-4-(2-diethylaminoethylimino)-1,4-dihydroquinoline omega-methohalide.

9. A hydrohalide of 3-chloro-4-(2-diethylaminoethylimino)-1-methyl-1,4-dihydroquinoline omega-methohalide.

References Cited in the file of this patent

UNITED STATES PATENTS

| | | |
|---|---|---|
| 2,454,949 | Shonle et al. | Nov. 30, 1948 |
| 2,526,417 | Reitsema | Oct. 17, 1950 |

OTHER REFERENCES

Surrey et al.: Jour. Am. Chem. Soc., vol. 68, pp. 1244–1246 (1946).

Ochiai et al.: Journal Pharm. Soc. (Japan), vol. 66, pp. 12–13 (1946).